US005558363A

United States Patent [19]
Dahl

[11] Patent Number: 5,558,363
[45] Date of Patent: Sep. 24, 1996

[54] SLIDE-ON COMBUSTION CHAMBER FOR AUTOMOTIVE AIRBAG MODULE

[75] Inventor: Kim V. Dahl, Clinton, Utah

[73] Assignee: Morton International, Inc., Chicago, Ill.

[21] Appl. No.: 524,871

[22] Filed: Sep. 7, 1995

[51] Int. Cl.$^6$ .............. B60R 21/20; B60R 21/26
[52] U.S. Cl. .......... 280/728.2; 280/732; 280/736
[58] Field of Search ................ 280/728.2, 732, 280/736, 740, 741, 728.1, 730.1

[56] References Cited

U.S. PATENT DOCUMENTS

| | | | |
|---|---|---|---|
| 5,088,764 | 2/1992 | Augustitus et al. | 280/736 |
| 5,167,426 | 12/1992 | Mihm et al. | 280/736 |
| 5,197,756 | 3/1993 | Jarboe et al. | 280/741 |
| 5,407,223 | 4/1995 | Lauritzen et al. | 280/728.2 |
| 5,431,432 | 7/1995 | Webber et al. | 280/732 |
| 5,441,299 | 8/1995 | Lauritzen et al. | 280/732 |

FOREIGN PATENT DOCUMENTS

| | | | |
|---|---|---|---|
| 2118301 | 7/1972 | France. | |
| 3-186454 | 8/1991 | Japan | 280/736 |

Primary Examiner—Anne Marie Boehler
Assistant Examiner—Peter C. English
Attorney, Agent, or Firm—George W. Rauchfuss, Jr.; Gerald K. White

[57] ABSTRACT

A slide-on combustion chamber for an automotive airbag module has a pair of side rails extending along its tubular outer wall which are designed to slide into matching grooves in the reaction canister. Portions of the side rails are removed at one or both ends of the combustion chamber, thereby allowing the side wall to be radially formed over a base member housed within the chamber.

12 Claims, 1 Drawing Sheet

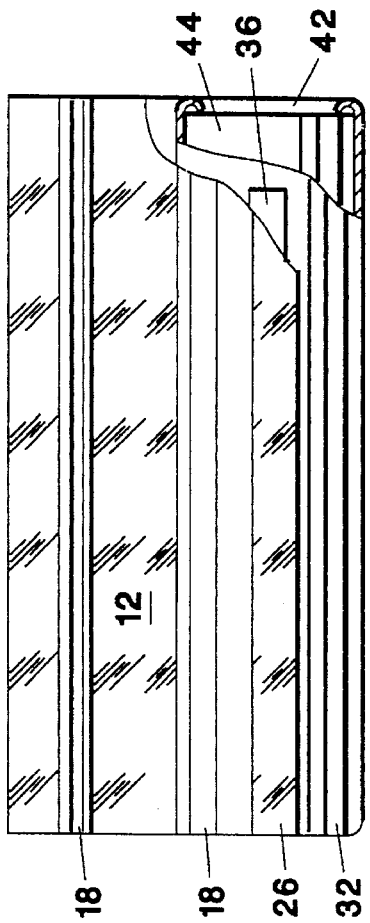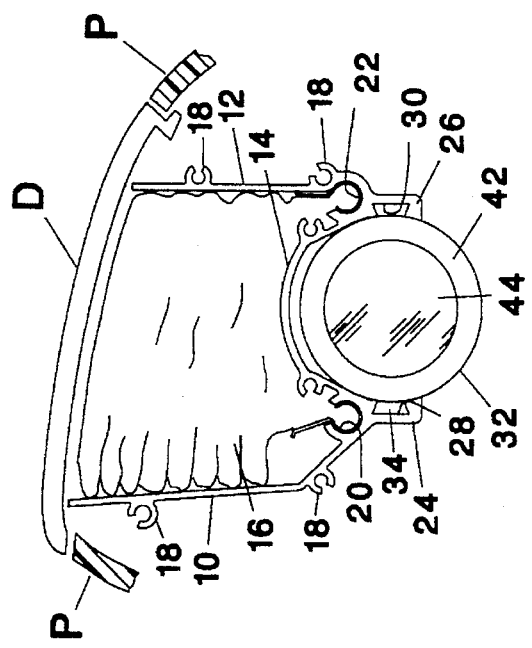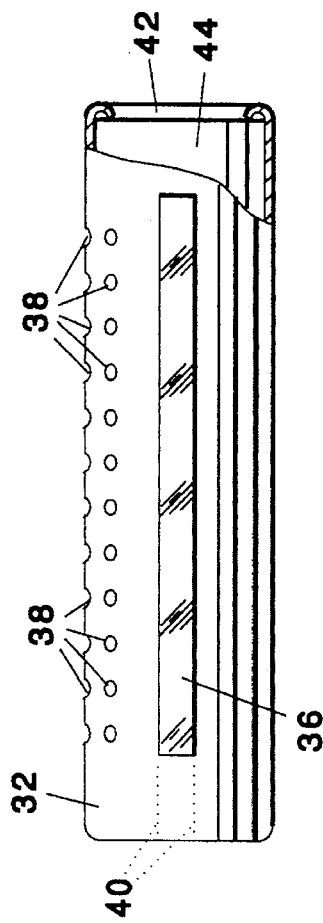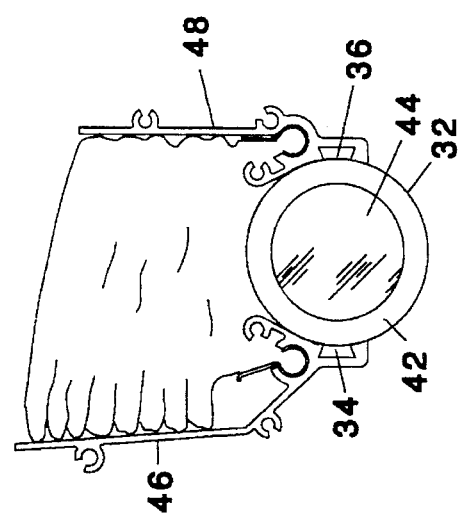

5,558,363

SLIDE-ON COMBUSTION CHAMBER FOR AUTOMOTIVE AIRBAG MODULE

TECHNICAL FIELD

This invention relates to automotive airbag modules. More particularly, it relates to a slide-on combustion chamber for such a module having radially formed ends.

BACKGROUND ART

It is known to provide passenger-side airbag modules with slide-on combustion chambers. One such module is disclosed in U.S. Pat. No. 5,407,223 of Lauritzen, et al. In such a construction, the combustion chamber is commonly in the form of a hollow cylinder which is extruded with side rails. The body of the reaction canister includes channels which receive the side rails. Because of the presence of the side rails, the ends of the combustion chamber cannot be radially formed over an inner base member. Instead, end plates are screwed onto the ends of the combustion chamber. While such a construction is satisfactory in many circumstances, it would sometimes be desirable to radially form the ends of the combustion chamber.

Accordingly, it is a primary object of the present invention to provide an airbag module having a slide-on combustion chamber with ends that may be radially formed. Other objects, features, and advantages will become apparent from the following description and appended claims.

DISCLOSURE OF INVENTION

The invention comprises an extruded cylindrical combustion chamber having extruded side rails thereon which are received in channels in the reaction canister. The side rails terminate short of at least one end of the combustion chamber, thereby allowing that end of the chamber to be radially formed to seal against an internal base member.

BRIEF DESCRIPTION OF DRAWINGS

FIG. 1 is an end view of an airbag module in accordance with the invention with the end plates removed;

FIG. 2 is a right-side elevation of the module of FIG. 1, partially broken away to illustrate its internal construction;

FIG. 3 is an elevational view of the combustion chamber portion of the module of FIGS. 1 and 2, partially broken away to illustrate its internal construction; and FIG. 4 is an illustration similar to FIG. 1 illustrating a modification of the invention.

BEST MODE FOR CARRYING OUT THE INVENTION

FIG. 1 is an end view of an airbag module mounted behind the breakaway airbag door D of an instrument panel P. The module comprises a reaction canister formed by a pair of substantially parallel side walls 10, 12 interconnected by a diffuser 14, forming a unitary one-piece construction, and housing a folded airbag 16. The canister includes the usual screw preparations 18 for retaining end plates which, in the drawings, are removed. The reaction canister also includes a pair of internal channels 20, 22 for retaining the open mouth of the airbag over the diffuser 14 in the conventional manner.

Extending downwardly from the lower edge of each of the side walls 10, 12 is a respective shoulder 24, 26, each of which defines an internal dovetail groove 28, 30. A cylindrical tubular combustion chamber 32 is carried on the reaction canister by means of dovetail rails 34, 36 which extend longitudinally along diametrically opposite sides of its outer wall and slide into grooves 28, 30.

The term "combustion chamber" as used herein is intended to cover a member which either serves as an inflator or houses an internal inflator. As illustrated in FIG. 3, the combustion chamber 32 carries a plurality of gas ports 38 for releasing gas into the canister. In the illustration of FIG. 1, this gas is dispersed and distributed by holes (not shown) in the diffuser 14.

As explained above, it is often desirable to radially form the ends of the combustion chamber 32 to seal against an internal base member. However, this is not normally possible when the chamber body is extruded with rails which extend to its ends. In accordance with the present invention, this problem is overcome by milling, or otherwise cutting away, the ends of the rails 34, 36 adjacent each end of the combustion chamber 32. The missing portion of a removed end of the rail 36 is indicated by the dotted lines 40 in FIG. 3. Either one or both ends of each rail is removed, depending upon whether one or both ends of the wall of the combustion chamber 32 is to be radially formed. In the illustrated embodiment, both ends are radially formed, resulting in an annular shoulder 42 at each end which seals tightly against an internally retained end base member 44. It will be understood that, after the combustion chamber 32 is slid into the grooves of the reaction canister, it is retained in place by means of the reaction canister end plates which are thereafter applied.

A modification of this invention is illustrated in FIG. 4. In this modification, a reaction canister is formed by a pair of unconnected side walls 46, 48. Each side wall carries the requisite groove for receiving a respective rail 34, 36 and they are further interconnected by means of the end plates, rather than by a diffuser.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In an automotive airbag module including first and second side walls for housing a deflated airbag therebetween and an elongated tubular combustion chamber extruded with an outer wall having integral first and second side rails extending longitudinally therealong and connected to both of said side walls for inflating said airbag, the improvement which comprises:

said combustion chamber having first and second ends and wherein said first and second side rails terminate short of the first end of said chamber;

an end base member housed within the first end of said combustion chamber; and said outer wall at the first end of said combustion chamber being radially formed to seal said base member within the first end of said combustion chamber.

2. The improvement of claim 1 wherein said side rails are on substantially diametrically opposite sides of said combustion chamber.

3. The improvement of claim 2 wherein said first and second side rails terminate short of both of said first and second ends of said chamber.

4. The improvement of claim 3 wherein said outer wall at both the first and second ends of said combustion chamber is radially formed to seal a base member within each of the respective first and second ends.

5. The improvement of claim 4 wherein said first and second side walls are interconnected by a diffuser.

6. The improvement of claim 5 wherein said first and second side walls and diffuser form a unitary one-piece construction.

7. The improvement of claim 1 wherein said first and second side rails terminate short of both of said first and second ends of said chamber.

8. The improvement of claim 7 wherein said outer wall at both the first and second ends of said combustion chamber is radially formed to seal a base member within each of the respective first and second ends.

9. The improvement of claim 1 wherein said first and second side walls are interconnected by a diffuser.

10. The improvement of claim 9 wherein said first and second side walls and diffuser are a unitary one-piece construction.

11. The method of manufacturing a combustion chamber for an automotive airbag module which comprises:

forming a substantially tubular, cylindrical outer wall having a first and a second end and first and second spaced side rails extending longitudinally therealong from said first to said second end;

removing a portion of each of said first and second side rails adjacent said first end;

inserting a base member into said first end; and radially forming said outer wall at said first end to seal against said base member.

12. The method of claim 11 including the additional steps of:

removing a portion of each of said first and second side rails adjacent said second end;

inserting a second base member into said second end; and radially forming said outer wall at said second end to seal against said second base member.

* * * * *